Figure 1:
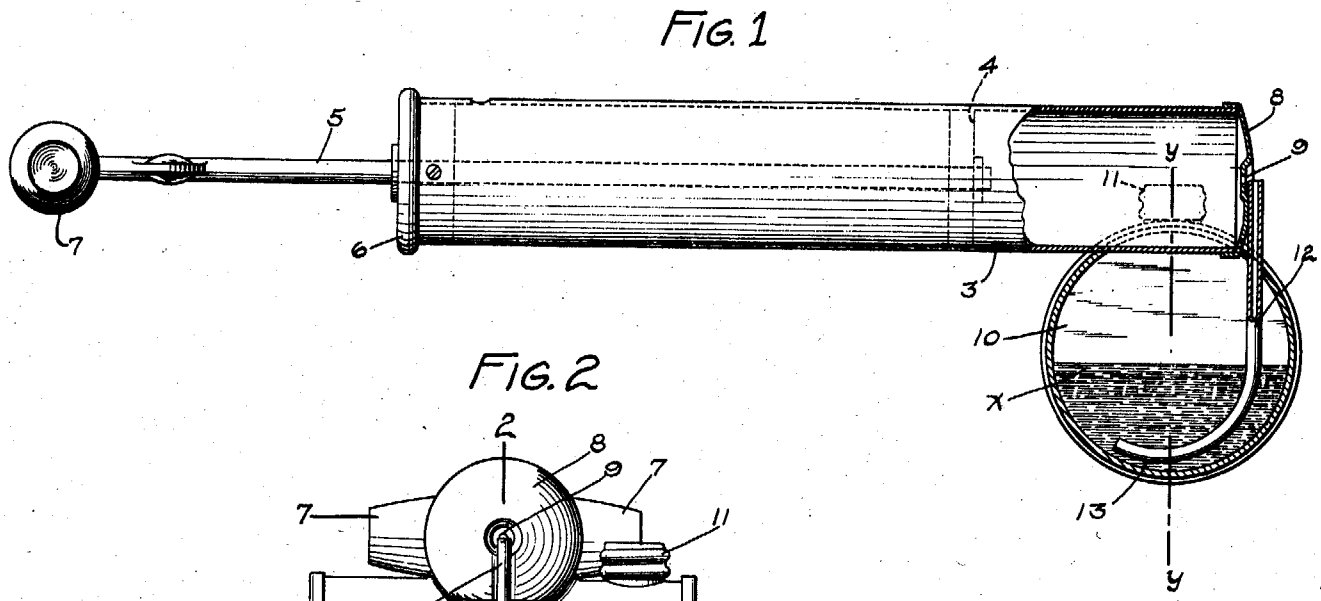

May 15, 1928.

Re. 16,961

A. W. KEGLER

SPRAYER

Original Filed Dec. 6, 1923

Inventor
ANTON W. KEGLER
By Paul Paul & Moore
Attorneys

Reissued May 15, 1928. Re. 16,961

UNITED STATES PATENT OFFICE.

ANTON W. KEGLER, OF MINNEAPOLIS, MINNESOTA.

SPRAYER.

Original No. 1,639,297, dated August 16, 1927, Serial No. 678,880, filed December 6, 1923. Application for reissue filed November 16, 1927. Serial No. 233,697.

My invention provides a simple but highly important improvement in hand-operated sprayers of the cylinder and pump type, such as are especially adapted for spraying of fly-destroying solutions, disinfectants, germicides, and the like, and to such ends, generally stated, the invention consists of the novel construction, combinations and arrangements of parts hereinafter described and defined in the claims.

In sprayers of this type, a small liquid-containing tank is mechanically connected or attached to a pump cylinder and the liquid is drawn from the tank through a small liquid-delivery tube by suction produced at the outer end of said tube by a small blast of air blown from the pump cylinder across the delivery or outer end of said liquid-delivery tube. In the customary arrangement, the liquid-containing tank is a small cylinder arranged below and extended transversely of the delivery end of the pump cylinder, and its axis is considerably at the rear of the discharge orifice of the pump cylinder and of the delivery end of the liquid-delivery tube. In such arrangement, it has been customary to extend the liquid-delivery tube vertically downward from the air discharge orifice of the pump cylinder and to terminate the same near the bottom but forward of a line drawn perpendicularly downward from the axis of the pump cylinder through the axis of the cylindrical tank. Such an arrangement works very satisfactorily as long as the sprayer is used with the pump cylinder either horizontal or with its delivery end turned downward, but when the pump cylinder is turned obliquely with its delivery end upward, as is very frequently required in operating above the head of the operator, then the sprayer will cease to act while there is still a considerable amount of the spraying liquid within the tank. Otherwise stated, it has been impossible to spray all of the liquid out of the tank when the sprayer is used to deliver or throw an upward spray.

I obviate this defect simply by extending the receiving end of the liquid delivery tube downward and backward on the line of a curve somewhat closely following the curved bottom of the tank to a point rearward of a line extended vertically downward from the axis of the pump cylinder through the axis of the cylindrical tank.

In the accompanying drawings, which illustrate a sprayer with the liquid-delivery tube arranged in accordance with my invention, like characters indicate like parts throughout the several views.

Figure 2:
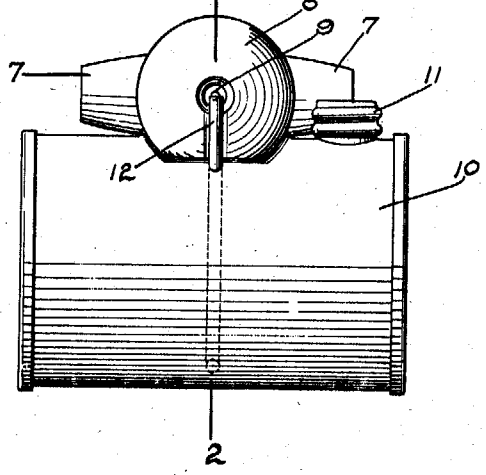

Referring to the drawings:

Fig. 1 is a side elevation with some parts sectioned on the line 2—2 of Fig. 1; and Fig. 2 is a front end elevation of the sprayer shown in Fig. 1.

The numeral 3 indicates the pump cylinder and the numeral 4 indicates the pump piston, the latter being secured in the usual or any suitable way to a piston rod 5 that works through the rear head 6 of the cylinder and is provided with a suitable hand piece 7. The pump cylinder is provided in its front end head 8 with a small axial air discharge orifice 9. The numeral 10 indicates a cylindrical liquid-containing tank that is secured to the lower front end portion of the cylinder 3 by solder or any other suitable means, and, as shown, is provided with a removable filler cap 11. I have found it convenient in securing the tank and pump cylinder together to make a seat in the top of the cylindrical tank 10 by cutting away a portion thereof that will fit closely around the sides of the end of the pump cylinder as shown in Fig. 1. After these parts are attached by solder there are extended contracting portions, as shown, which serve to brace the parts together, and prevent the tank from breaking loose from the cylinder by ordinary wear.

The numeral 12 indicates the liquid-delivery tube, the upper portion of which is preferably straight and vertically disposed or extended perpendicularly to the axis of the pump cylinder and is soldered or otherwise rigidly secured to the cylinder head 8 with its upper end terminating in axial alignment with the discharge orifice 9. Around the orifice 9 there is a depression in the head 8 as shown in the drawings. This depression has a useful function. As the air is driven rapidly from the orifice 9 the depression around the orifice influences the column of air as it is forced through the orifice and permits a spreading action and as the liquid ascends through the tube 12 and is converted near the orifice into a fog or mist, it is found that this depression around the orifice aids in subdividing the mist particles and gets a decidedly improved fog or spray. The lower portion of this tube 12 extends down into the tank 10 and its curved lower end 13, as already indicated, is extended on the line of a curve and terminates close to the bottom of the tank at a point at the rear of a line extended perpendicularly downward from the axis of the pump cylinder through the axis of the tank 10, said imaginary line being indicated on Fig. 1 by a broken line marked *y—y*. It is evident from the disclosure that should the pump cylinder 3 be pointed upwardly, the fluid in the tank 10 would flow to the left in Fig. 1 and the end of the pipe 13 would remain covered with fluid until nearly all the fluid is exhausted. On the other hand, if the cylinder 3 of the pump be pointed downwardly, the fluid which had entered the bend in the bottom of the tube 12 would remain in the pipe and supply the fluid necessary for the spray as the piston was operated back and forth until the fluid in the bend was exhausted.

From the foregoing, it is obvious that the important advantages of this improved tube are accomplished without any additional cost. In Fig. 1, the liquid tube spread is indicated at *x*.

What I claim is:

1. A sprayer comprising a pump piston and a cylinder of uniform bore from end to end, the pump cylinder having a cylinder head with a single open orifice near its center, a cylindrical tank with its axis extending transversely of said pump cylinder and having a seat formed in the cylindrical wall of the tank of substantial arcual extent to receive a portion of the head and the lower side of the pump cylinder, the cylindrical wall of the tank extending a substantial distance above the lower portion of the pump cylinder and the head and being in contacting relation with the outer face of said head and soldered to said cylinder and head, a liquid delivery tube extending from near the bottom of the tank upwardly to said orifice and along the outer wall of the pump cylinder head and soldered thereto, the lower end of the tube extending close around the inner wall of the tank, and a substantial distance rearwardly of a line drawn perpendicularly downwardly from the axis of the pump cylinder through the axis of said tank.

2. A sprayer comprising a pump piston and a cylinder having a cylinder head with an open orifice therein, a tank extending transversely of the length of said pump cylinder and over which the end of the pump cylinder lies and to which it is attached, a liquid delivery tube extended from near the bottom of the tank upwardly to said orifice and along the outer wall of the pump cylinder head and attached thereto, the lower end of the tube extending around the inner wall of the tank and a substantial distance rearwardly of a line drawn perpendicularly downwardly from the axis of the pump cylinder through the axis of said tank, whereby when the pump cylinder is pointed upwardly the lower end of the tube will remain below the surface of the liquid in the tank even though it be nearly exhausted and when the pump is pointed downwardly enough liquid will remain in the bend of the tube to form a spray when the pump piston is operated.

3. A sprayer comprising a pump piston and a pump cylinder of uniform bore throughout its length, a head for the cylinder with a single open orifice therein, a cylindrical tank having its axis extended transversely of said pump cylinder and having a hole cut out in the cylindrical wall of the tank to receive a portion of the lower side of the pump cylinder and its head, said hole forming for the pump cylinder and head seat of substantial arcual extent with the under side and head of the cylinder fitted into the hole with the outer face of the head in abutting relation to the tank wall, said cylinder and head soldered to the cylindrical wall of the tank, a liquid delivery tube extended from near the bottom of the tank upwardly to said orifice along the outer wall of the cylinder head and soldered thereto, the lower end of the tube extending closely to the inner wall of the tank and a substantial distance rearwardly of a line drawn perpendicularly downwardly from the axis of the pump cylinder through the axis of the tank.

4. A sprayer comprising a pump piston and a cylinder in which said piston is reciprocable, said cylinder having a cylinder head with an open orifice therein, a tank over which the discharge end portion only of the pump cylinder lies and to which it is attached, a liquid delivery tube extending from near the bottom of the tank upwardly to said orifice and along the wall of the pump cylinder head and attached thereto, the portion of the tube within the tank extending downwardly and rearwardly through the tank and a substantial distance rearwardly of a line drawn perpendicularly downward from the axis of the pump cylinder through the axis of the tank and terminating within the tank and near its bottom wall, whereby when the pump cylinder is pointed upwardly the lower end of the tube will remain below the surface of the liquid in the tank even though it be nearly exhausted and when the pump is pointed downwardly enough liquid will remain in the rearward portion of the tube to form a spray when the pump piston is operated.

5. A sprayer comprising a pump piston and a cylinder of uniform bore from end to end in which said piston is reciprocable, a cylinder head with an open orifice therein, a tank over which the discharge end portion only of the pump cylinder lies and to which it is attached, a liquid delivery tube attached to the outer side of the head and extending from near said orifice downwardly along the outer wall of the pump cylinder head into the tank, thence downwardly and rearwardly through the interior of the tank and terminating within and near the bottom wall thereof the lower part of the tube extending a substantial distance rearwardly of a line drawn perpendicularly downward from the axis of the pump cylinder through the axis of the tank whereby, when the pump is pointed upwardly, the lower end of the delivery tube will extend below the upper surface of the liquid therein although the liquid is nearly exhausted and when the pump is pointed downwardly enough liquid will remain in the lower portion of the tube to form a spray when the pump piston is operated.

In witness whereof, I have hereunto set my hand this 28th day of September, 1927.

ANTON W. KEGLER.